United States Patent [19]

Vrouenraets

[11] Patent Number: 4,514,472
[45] Date of Patent: Apr. 30, 1985

[54] PACKAGING FILM PERMEABLE TO SMOKE CONSTITUENTS AND PACKAGED SMOKED FOODSTUFF

[75] Inventor: Cornelius M. F. Vrouenraets, Dieren, Netherlands

[73] Assignee: Akzo nv, Arnhem, Netherlands

[21] Appl. No.: 557,000

[22] Filed: Dec. 1, 1983

[30] Foreign Application Priority Data

Dec. 2, 1982 [NL] Netherlands .......................... 8204674

[51] Int. Cl.³ ...................... B32B 27/36; A22C 13/00
[52] U.S. Cl. .................................... 428/220; 426/105; 426/106; 426/129; 426/135; 426/415; 428/36; 428/480
[58] Field of Search .................... 428/480, 220, 36; 426/105, 106, 129, 135, 415

[56] References Cited

U.S. PATENT DOCUMENTS 4,335,188  6/1982  Igi et al. ........................ 428/480 X
4,401,135  8/1983  Andrä et al. ................... 426/105 X
4,410,011  10/1983  Andrä et al. ................... 426/105 X

*Primary Examiner*—Thomas J. Herbert
*Attorney, Agent, or Firm*—Stevens, Davis, Miller & Mosher

[57] ABSTRACT

A packaging film which is permeable to smoke constituents is made from a thermoplastic copolyester. The copolyester is built up of recurrent long-chain and short-chain ester units which are joined head-to-tail through ester bonds, the long-chain ester units corresponding to the formula

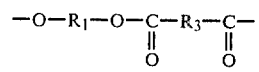

and the short-chain ester units to the formula:

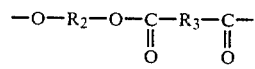

where $R_1$ is a divalent radical remaining after removal of the terminal hydroxyl groups from a poly(alkylene oxide) glycol having a molecular weight in the range of 600 to 6000 and a carbon to oxygen ratio of 2,0 to 2,7; $R_2$ is a divalent radical remaining after removal of the hydroxyl groups from a diol having a molecular weight not higher than 250; $R_3$ is a divalent radical remaining after removal of the carboxylic acid groups from a dicarboxylic acid. Said long-chain ester units amount to 20 to 60% by weight of the copolyester and at least 70% of the $R_3$ groups are 1,4-phenylene radicals. The phenol number of the film, expressed in mg per m², is at least 20.

The film is particularly suitable for packaging foodstuffs that are smoked in the packaged state, such as smoked sausages.

13 Claims, No Drawings

PACKAGING FILM PERMEABLE TO SMOKE CONSTITUENTS AND PACKAGED SMOKED FOODSTUFF

The invention relates to packaging film, particularly for foodstuffs, which is permeable to smoke constituents. The invention also relates to packaged smoked foodstuffs.

Packaging films permeable to smoke constituents are known. For example, in the preparation of smoked sausage use is made of the intestines of stock for slaughter. Considering the varying quality of animal intestines, their use gives rise to great problems in view of modern stuffing and packaging methods. Moreover, animal intestine is not at all available in sufficiently large quantities to cope with the demand for smoke-permeable sausage casings.

A different type of film known as smoke-permeable packaging material for foods is entirely or partly composed of cellulose.

Such a type of film, too, has its drawbacks. It can only be processed as sausage casing if it contains a hygroscopic plasticizer. Another drawback to the films based on cellulose has to do with the process by which they are prepared. In that process the cellulose is formed into film by the viscose method, i.e. by alkalizing, xanthating, dissolving in caustic soda, spinning into an acid coagulation bath, desulphurizing, washing, adding a plasticizer and drying to obtain film. The disadvantages to this method are that it requires the use of many intermediate agents and will give problems because of attendant pollution of the atmosphere and the waste water. A further disadvantage to sausage casings of cellulose is that they are not resistant to sterilization at elevated temperature. As starting materials for food packaging film also synthetic materials such as polyamides, polyesters and polyvinylidene chloride have been proposed.

The German Auslegeschrift 24 31 076 discloses films of polyester block copolymers built up from a polyester and a polyalkylene glycol. For packaging film it is preferred that use should be made of block copolymers of polytetramethylene terephthalate and polytetramethylene oxide in the weight ratio ranging from 90:10 to 40:60.

British Patent Specification No. 1,496,368 discloses food packaging films made from a polymer mixture made up of a polyester and a block copolyester. The block copolymer is built up of hard (crystalline) segments, such as tetramethylene terephthalate radicals, and soft (non-crystalline) segments, such as polyethylene oxide radicals. The polymer mixture contains 0.5–10% by weight of the non-crystalline component. Netherlands Patent Application 7 317 788 discloses a layered tubular film of thermoplastic synthetic materials suitable for packaging meats and sausages. In a two-layer form the film may consist of an outer layer of a polyester elastomer and an inner layer of a water-impermeable polymer.

The disadvantage to these synthetic packaging films is that they are not or hardly permeable to smoke constituents. They are therefore unsuitable for use as packaging film for foods that are to be smoked while in the packaged state. More particularly, they are unsuitable for use as casing for smoked sausage. The disadvantages to the known films are removed by the present invention.

The invention is characterized in that the film of the type indicated above entirely or substantially consists of a thermoplastic copolyester which is built up of recurrent long-chain and short-chain ester units which are joined head-to-tail through ester bonds, the long-chain ester units corresponding to the formula

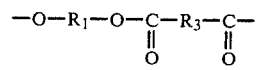

and the short-chain ester units to the formula:

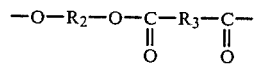

where $R_1$ is a divalent radical remaining after removal of the terminal hydroxyl groups from a poly(alkylene oxide) glycol having a molecular weight in the range of 600 to 6000 and a carbon to oxygen ratio of 2,0 to 2,7; $R_2$ is a divalent radical remaining after removal of the hydroxyl groups from a diol having a molecular weight not higher than 250; $R_3$ is a divalent radical remaining after removal of the carboxylic acid groups from a dicarboxylic acid; with the proviso that said long-chain ester units amount to 20 to 60% by weight of the copolyester and at least 70% of the $R_3$ groups are 1,4-phenylene radicals, and the phenol number of the film, expressed in mg per $m^2$, is at least 20.

The term long-chain ester units as used herein refers to the units that are present in the conversion product of a long-chain glycol and a dicarboxylic acid. The long-chain glycols in the product according to the invention are poly(alkylene oxide) glycols having a molecular weight in the range of 600 to 6000 and mainly contain units derived from epoxy ethane, so that the atomic ratio of carbon to oxygen is 2.0 to 2.7. By the atomic ratio of carbon to oxygen is to be understood the ratio of the total number of carbon atoms present in all $R_1$ groups to the total number of oxygen atoms in said groups. It is preferred that the long-chain glycol should entirely consist of poly(ethylene oxide) glycol. In some cases it may be desirable that units of a second poly(alkylene oxide) glycol should be present.

Generally, this second glycol will form less than 40 mole % of the long-chain ester units, and preferably less than 20 mole %. Representative second monomers for the long-chain ester units are 1,2- and 1,3-epoxy propanes, 1,2-epoxy butane and tetrahydrofuran. Irrespective of the second monomer used in the poly(alkylene oxide) glycol the carbon to oxygen ratio in the poly(alkylene oxide) glycol groups of the copolyester according to the invention should not be higher than 2.7, and the permeability to smoke should be such that the phenol number of the film formed from the copolyester is at least 20 mg per $m^2$. As long as said requirements are satisfied, also use may be made of mixtures of poly(ethylene oxide) glycol and a second poly(alkylene oxide) glycol, such as poly(1,2-propylene oxide) glycol or poly(tetramethylene oxide) glycol. The carbon to oxygen ratio of 2.0 to 2.7 refers to the radical remaining after removal of the terminal hydroxyl groups from the poly(alkylene oxide) glycol. The term short-chain ester units as used herein refers to units present in the conversion product of a diol having a molecular weight not higher than 250 and a dicarboxylic acid.

As diols that may be converted into short-chain ester units may be mentioned acyclic, alicyclic and aromatic dihydroxy compounds. Preference is given to the use of aliphatic diols having 2–4 carbon atoms. Particularly preferred is the 1,4-butanediol. Instead of diols corresponding ester forming derivatives may be used. In that case the molecular weight requirement pertains to the diol only and not to its derivatives.

Dicarboxylic acids which are reacted with the foregoing long chain glycols and low molecular weight diols to produce the copolyesters of this invention are aliphatic, cycloaliphatic or aromatic dicarboxylic acids. of a low molecular weight, i.e., having a molecular weight of less than 300. The term "dicarboxylic acids" as used herein, includes acid equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivatives. The dicarboxylic acids can contain any substituent groups or combinations which do not substantially interfere with the copolyester polymer formation and use of the polymer in the film according to the invention. Preference is given to the use of aromatic dicarboxylic acids, more particularly the phenylene dicarboxylic acids.

It is essential that at least 70 mole percent of the dicarboxylic acid incorporated into the copolyester be terephthalic acid. Thus, at least 70% of the $R_3$ groups in the formulae above are 1,4-phenylene groups. Preferably, 100% of $R_3$ groups are 1,4-phenylene radicals.

The copolyesters of the film according to the invention contain 20 to 60% by weight of long-chain ester units. It is preferred that the film according to the invention should be made of a copolyester prepared from dimethyl terephthalate, 1,4-butanediol and poly(ethylene oxide) glycol having a molecular weight in the range of 800 to 4000. The copolyesters described herein may be prepared by a conventional ester interchange reaction. A preferred procedure involves heating the dimethyl ester of terephthalic acid with poly(ethylene oxide) glycol and a molar excess of butanediol in the presence of catalyst, followed by distilling off methanol formed by the interchange. This procedure results in the preparation of a low molecular weight prepolymer. Such prepolymers can also be prepared by other methods. For example, the long-chain glycol can be reacted with a high or low molecular weight short-chain ester homopolymer or copolymer in the presence of a catalyst.

The short-chain ester homopolymer or copolymer can be prepared by ester interchange from either the dimethyl esters and low molecular weight diols, as above, or from the free acids with the diol acetates. Alternatively, the short-chain ester copolymer can be prepared by direct esterification from appropriate acids, an hydrides or acid chlorides, for example, with diols or by other processes such as reaction of the acids with cyclic ethers or carbonates. The resulting prepolymer is then carried to high molecular weight by distillation of the excess of short-chain diol. This process is known as "polycondensation". Additional ester interchange occurs during this distillation to increase the molecular weight and to randomize the arrangement of the copolyester units. It is preferred that in this polycondensation use should be made of a catalyst. Polycondensation of prepolymer can also be accomplished in the solid phase by heating finely divided solid prepolymer in a vacuum or in a stream of inert gas to remove liberated low molecular weight diol. The copolyesters of this invention can be stabilized to heat or radiation by ultraviolet light by the incorporation therein of the conventional stabilizers. Also other additives may be used, provided that they do not have an unduly detrimental effect on the mechanical properties, permeability to smoke and other service properties. The aforedescribed copolyester are processed into the packaging film of this invention by methods known per se. Methods for the manufacture of films are described, among other places, in Kirk-Othmer Encyclopedia of Chemical Technology, Vol. 9 (1966), 220–244.

The films of this invention may be tubular or in the form of flat sheets. The tubular form is preferably obtained by the known film blowing process. The tubular film according to the invention is excellently suitable for use as casing for smoked sausages. Flat films according to the invention may be supplied as such to food processors and be brought into their desired shape simultaneously with the proportioning of the foodstuff they are to encase.

The thickness of the film according to the invention is chosen in agreement with the envisaged use of the film. The thickness is generally in the range of 1 to 300 $\mu$m, preferably 5 to 100 $\mu$m. In addition to the composition of the copolyester from which the film is made its thickness is one of the factors determinative of the degree of permeability to smoke. The thickness is moreover very much determinative of the mechanical properties of the film. With a given composition of the copolyester the permeability to smoke generally decreases and the strength increases with increasing thickness of the film. At constant film thickness permeability to smoke generally increases with increasing content of long-chain ester units in the copolyester. To obtain some particular permeability to smoke constituents the film thickness and the composition of the copolyester of which the film is made need be adapted to each other. Within the scope of the present invention the skilled man is capable of making such a choice of film thickness and copolyester composition as will lead to optimum properties for the end use envisaged as far as smoke permeability and mechanical performance are concerned. Films that are very satisfactorily permeable to smoke constituents and have excellent mechanical properties and also have all other properties required for their use as sausage casing are obtained using a film thickness in the range of 5 to 100 $\mu$m and a copolyester consisting of polybutylene terephthalate and 30 to 45% by weight of poly(ethylene oxide) glycol having a molecular weight in the range of 800 to 4000.

The film of this invention may be drawn or not. For certain uses, particularly as sausage casing, it is preferred that use should be made of a drawn film. When the film is drawn, it will display some shrinkage at elevated temperatures. Following a treatment for three hours in water of 80° C. shrinkage of the film both in longitudinal and in transverse direction is preferably more than 5%, particularly more than 10%. After the successive process steps of stuffing, smoking, pasteurizing and cooling of the sausage the shrinkage power of the film will cause it to form a tight sausage casing without any wrinkles. The film according to the invention may be drawn uniaxially or biaxially. It is preferred that the film should be drawn biaxially. The uni- or biaxial drawing may be carried out by methods kown in themselves. Thus, a biaxially drawn tubular film may be made by blown film extrusion, followed by biaxial drawing at a ratio of 1,5-6 in longitudinal and transverse direction, for instance by applying the so-called Inflated bubble technique known in itself, use being made of a gas filled drawing bubble. Drawing may be carried out at any suitable temperature, for instance in the range of 60° to 100° C.

The film according to the invention is properly permeable to smoke constituents. In the process of smoking foodstuffs, more particularly meats and sausages, constituents of the smoke penetrate into the food, imparting to it a special colour and flavour. Packaging film used as casing for sausages should therefore be effectively permeable to the particular smoke constituents. A measure of smoke permeability is the phenol number of the film. This quantity is determined experimentally by filling a tubular film with water and subjecting it to a smoking process under standard conditions. The next step consists in determining the amount of phenols which has passed through the film into the water. From the data obtained in this test the phenol number of the film, expressed in mg per $m^2$, can be calculated. The film according to the invention has a permeability to smoke constituents corresponding to a phenol number of at least 20. It is preferred that the phenol number of the film should be at least 50. Depending on its composition and thickness the film of this invention may have a phenol number of up to 1000 or higher. The phenol number is especially a measure of the flavour determining constituents of the smoke. Organoleptic examination has shown that the magnitude of the phenol number runs parallel to the intensity of the smoke flavour of a smoked meat product. A sausage provided with a casing having a phenol number lower than 20 displays an insufficiently strong smoke flavour after smoking under conditions usually employed in actual practice. In addition to flavour determining constituents smoke contains colour determining constituents. They give the smoked product its favoured typical brown smoke colour. In cases where the absence of the brown colour is no objection or even desirable use may be made of films whose permeability to colour determining agents is limited. It is assumed that the colour determining constituents are mainly aldehydes. The present invention uses the aldehyde number as a measure of the permeability of a film to colour determining constituents.

As in the procedure used for measuring the phenol number, it is determined by measuring the rate of transmission of aldehyde through the film under standard conditions. The aldehyde number is expressed in mg per $m^2$. Depending on the composition and thickness of the film according to the invention its aldehyde number may be in the range of 850 to 100,000 or higher. The preferred aldehyde number of the film according to the invention is 3000 or higher. With a particularly favourable embodiment according to the invention the film is made of a copolyester consisting of polybutylene terephthalate and 30-45% by weight of poly(ethylene oxide) glycol having a molecular weight in the range of 800 to 4000, the phenol number of the film is 50 to 500, the aldehyde number 3000 to 50,000 and the thickness 5 to 100 $\mu$m, and the film is biaxially drawn.

Not only can the permeability to smoke constituents be characterized with the phenol number and the aldehyde number, but also with the acid number. The acid number is indicative of the amount of acid smoke constituents transmitted through the film subjected to the smoking process conducted under standard conditions, as described hereinafter.

The acid number is determined by titration of the smoke water with 0.1N NaOH and phenolphthalein as indicator. The acid number is expressed in mg per $m^2$. Depending on its composition and thickness the film according to the invention has an acid number in the range of 200 to 50,000 or higher. It is preferred that the acid number should be at least 300, preferably at least 500. The film according to the invention is very suitable for packaging foodstuffs, more particularly foodstuffs that are smoked in the packaged state. Over the known cellulose films the film according to the invention has the following advantages: there is no need for it to be steeped in water prior to use, it can be welded because of its thermoplastic properties, it can be sterilized and its production requires fewer intermediate agents and is less harmful to the environment. Over the known synthetic films the film according to the invention has the great advantage that it is excellently permeable to smoke constituents and very suitable for use as packaging film for foodstuffs that are to be smoked. The film according to the invention is particularly suitable to be used as casing of smoked sausage.

The phenol number, the aldehyde number and the acid number are determined by the following standard procedures. The film to be examined is in the form of a tube. Flat films are previously formed into a tube by welding. It is preferred that the tubes should have a flat width of about 10 cm and a length of about 40 cm. The tubes are filled with water of 20° C., after which they are tied up at both ends. The resulting water sausages are subjected to the following smoking treatment. The sausages are hung on rods in a smoking chamber of the so-called single trolley type having an internal bottom surface area of about 1 $m^2$ and an internal height of about 2 m (made by Atmos, Mittelhäuser & Walter, Hamburg, GFR). The chamber is equipped with an air or smoke conditioner with which air or smoke of the desired temperature and humidity can be blown into the chamber. The air or smoke flows between the side walls and the water sausages. In upward direction the air or smoke flows past the sausages to be smoked and is subsequently sucked off at a central point and fed back to the air conditioner.

The air conditioner is controlled by a wet and dry bulb thermometer, with which respectively steam injection and heating or cooling are regulated. Smoke and air also may be sucked into the chamber. The surplus of smoke or air is discharged through a chimney. The smoke is produced in a smoke generator (for example of the KMA make, Kurtsiefer Masch. und Apparatenbau KG, Lohmar, FGR). In it pieces of oakwood (2-4 mm) are heated to about 340° C., which is attended with the development of smoke. The smoke thus formed is sucked into the smoking chamber. Smoking proceeds as follows. First, the water sausages are pre-conditioned in the absence of smoke for 30 minutes at 45° C. and 85-90% relative humidity. Thus, the sausages are given a uniform, somewhat moist surface. Subsequently, the smoke is admitted to the smoking chamber, in which it is exposed to smoke for 45 minutes at the same temperature and humidity. The smoke generator is provided with a mechanical wood feeder, so that per unit time always the same amount of smoke is sucked in. On conclusion of the smoking process the water sausages are removed from the smoking chamber and their length and diameter are measured.

The next step consists in measuring the volume of their watery contents, viz. the smoke water. Then the smoke water is transferred to brown glass bottles and analysed as follows.

To determine the phenol number 10 ml of smoke water are added to a mixture of 5 ml of ethanol, 5 ml of 0.5% by weight-borax and 50 ml of distilled water in a separatory funnel. To the resulting solution there is added 1 ml of a 2,6-dichloroquinone-4-chloroimide solution (0.05% by weight in 7% ethanol).

The solution was allowed to stand for 1 hour, after which 10 g of NaCl were dissolved in the mixture. The blue compound formed is extracted from the aqueous mixture with 15 ml of butanol-1. The blue solution separated is quantitatively transferred to a 25-ml volumetric flask and made up to the mark with butanol-1. Of the resulting solution the extinction at 632 nm is measured in a 1 cm cell (for instance with the aid of a Perkin Elmer UV/VIS spectrophotometer of the 554 type). Of the extinction thus measured the corresponding concentration of guaiacol solution subjected to the same treatment is read from a calibration graph. In that way the phenol content, expressed in mg of guaicol per 100 ml of smoke water, can be determined. The previously found dimensions of the water sausage being given, the phenol number can be calculated then. The phenol number is defined as the rate of phenol diffusion/m$^2$ film, expressed as mg of guaicol, under the conditions of the above-described standard procedure.

To determine the aldehyde number 10 ml of DNPH-reagent are added to 20 ml of smoke water. The DNPH-reagent is a solution of 2% by weight of 2,4-dinitrophenyl hydrazine in 40% w/w sulphuric acid. After addition of this reagent the mixture is heated for 20 minutes in a boiling water bath. After addition of 25 ml of water the mixture is cooled for 30 minutes in ice water. The hydrazone precipitate formed in filtered off, washed with cold water, dried and weighed. Thus the content in mg of DNPH derivatives (hydrazones) per 100 ml of smoke water is found. The dimensions of the water sausage being given, the aldehyde number can be calculated now. The aldehyde number is defined as the rate of diffusion per m$^2$ of film of carbonyl groups-containing compounds, expressed as mg of 2,4-dinitrophenyl hydrazones, as determined in accordance with the above-described standard procedure.

To determine the acid number 25 ml of smoke water are titrated with 0.1N NaOH, using phenolphthalein as indicator. The result is expressed in mg of acetic acid per 100 ml of smoke water. The dimensions of the water sausage being given, the acid number can be calculated now. The acid number is defined as the rate of acid diffusion, expressed in mg of acetic acid, per m$^2$ through film under the conditions of the above-described standard procedure.

The relative viscosity of the copolyester of the present invention is determined by dissolving 1 gramme of it in 100 grammes of metacresol, measuring the efflux time with a capillary viscometer at 25° C. and dividing it by the efflux time of the pure solvent determined in an analogous manner.

The invention will be further described in the following examples.

EXAMPLE I

In an autoclave four copolyesters were prepared from dimethyl terephthalate, 1,4-butanediol and poly-(ethylene oxide) glycol having a molecular weight of 4000.

The poly(ethylene oxide) glycol content of these copolyesters was 20, 30, 35 and 40% by weight, respectively. The relative viscosity of the copolyesters was 2.35; 2.54; 2.67 and 2.48, respectively. In the same way two copolyesters were prepared from dimethyl terephthalate, ethylene glycol and poly(ethylene oxide) glycol having a molecular weight of 4000, the poly-(ethylene oxide) glycol content of the copolyesters being 25 and 30% by weight, respectively, and their relative viscosity 2,12 and 2,15, respectively.

The copolyesters were subjected to postcondensation in the solid phase for 30 hours at 195° C. The relative viscosity of the resulting copolyesters based on 1,4-butanediol containing 20, 30, 35 and 40% by weight of poly(ethylene oxide) glycol (PEG), respectively, was 3.50; 3.46; 3.38 and 3.21, respectively, and of the copolyesters based on ethylene glycol containing 25 and 30% by weight of PEG, respectively, it was 3.78 and 3.15, respectively. Subsequently, the copolyesters were cast into flat films. Moreover, two biaxially drawn films were made. These films were made from copolyesters which had been prepared in the above-described way from dimethyl terephthalate, 1,4-butanediol and PEG having a molecular weight of 4000. The copolyesters contained 30 and 35% by weight of PEG, and after having been released from the autoclave they had a relative viscosity of 2.43 and 2.90, respectively, and after postcondensation in the solid phase a relative viscosity of 3.25 and 3.85, respectively. The films were drawn biaxially at 80° C. at a draw ratio of 3×3. The above-mentioned undrawn and biaxially drawn films were welded to form tubular films. The tubular films had a flat width of about 10 cm across and measured about 40 cm in length.

Of these tubular films the permeability to smoke was determined by filling them with water and measuring their phenol number, aldehyde number and acid number in accordance with the above-described standard methods. For comparison, a commercially available sausage casing, viz. Nalo Faser casing, made of cellulose reinforced with paper fibres, was examined. The results are summarized in Table A.

TABLE A

| film material | film thickness (μm) | phenol number (mg/m$^2$) | aldehyde number (mg/m$^2$) | acid number (mg/m$^2$) |
|---|---|---|---|---|
| PBT-20% PEG | 50 | 106 | 900 | 370 |
| PBT-30% PEG | 50 | 100 | 8720 | 2180 |
| PBT-35% PEG | 55 | 88 | 10070 | 2200 |
| PBT-40% PEG | 55 | 74 | 9690 | 2420 |
| PBT-30% PEG biaxially drawn | 50 | 73 | 3780 | 300 |
| PBT-35% PEG biaxially drawn | 50 | 65 | 6460 | 1000 |
| PET-25% PEG | 65 | 40 | 2720 | 360 |
| PET-30% PEG | 80 | 82 | 5750 | 1000 |
| Nalo Faser | 80 | 113 | 16000 | 2925 |

PBT = poly(1,4-butylene terephthalate)
PET = poly(ethylene terephthalate)
PEG = poly(ethylene oxide) glycol (mol. weight 4000)

EXAMPLE II

Use was made of the same procedure as given in Example I for making a tubular film having a thickness of 50 to 60 μm prepared from a block copolyester consisting of poly(1,4-butylene terephthalate) and 25% by weight of poly(ethylene oxide) glycol having a molecular weight of 4000. This film according to the invention was examined for its performance as casing for luncheon sausage and slicing sausage. For comparison, a commercially available sausage casing (Nalo Faser casing) was examined. The performance of the sausage casings was assessed during processing (stuffing, smoking, pasteurizing and drying), and their appearance, organoleptic properties of the sausage (smoke flavour) and peelability were evualated. The conditions under which luncheon sausage was processed were as follows:

a. preheating for 1 hour at 45° C. and 80% relative humidity (R.H.);
b. smoking for 1 hour at 45° C. and 80% (R.H.);
c. after-drying for 30 minutes at 45° C. in the absence of moisture;
d. pasteurizing for 2½ hours at 80° C. and 100° R.H.;
e. cooling to air at 15° C.

The conditions under which slicing sausage was processed were as follows:

a. the sausage meat contained 2% NaCl;
b. pickling for 4 days in a solution of 10% NaCl in water at 26° to 27° C.;
c. smoking for 1 hour at 20° C. and 80% RH.
d. drying for 3 weeks at 18° C.

The following results were obtained:

1. Tubular film of the invention stuffed with meat hardly differed from the commercially available sausage casing.
2. Performance during smoking, pasteurizing and drying was the same for the two sausage casings.
3. Organoleptic examination of the two sausage casings did not give any significantly different results.
4. The meat contained in the sausage casing according to the invention had not assumed the typical brown smoke colour.
5. Peelability of the sausage casing of the present invention was just as good as or better than that of the commercially available sausage casing.

EXAMPLE III (COMPARATIVE)

A copolyester consisting of poly(1,4-butylene terephthalate) and 35% by weight of poly(tetramethylene oxide) glycol having a molecular weight of 1000 was processed into a tubular film having a thickness of 60 m. The tubular film was drawn biaxially at 80° C. at a draw ratio of 3×3. The tubular film was used as casing for cooking sausage. Of the tubular film the following properties were determined by the above standard methods:

| phenol number | 7 mg/m² |
| aldehyde number | 800 mg/m² |
| acid number | 170 mg/m² |

After the sausage casing had been stuffed with the meat product, the resulting sausage was processed according to the following smoking and cooking programme:

a. preconditioning for 30 minutes at 45° C. and 85 to 90% RH;
b. smoking for 45 minutes under the same conditions as used during preconditioning;
c. drying for 30 minutes at 60° C. and a lowest possible relative humidity;
d. pasteurizing for 150 minutes at 80° C. and 100% RH;
e. cooling in water.

For comparison, a commercially available paper fibre casing was treated in the same manner.

The copolyester sausage casing was found to be poorly permeable to smoke constituents. The sausage examined displayed only a weak smoke flavour and no brown smoke colour. The sausage in the paper fibre casing, however, had the desired strong smoke flavour and brown smoke colour.

EXAMPLE IV

A copolyester was prepared from dimethyl terephthalate, 1,4-butanediol and poly(ethylene oxide) glycol having a molecular weight of 4000. The poly(ethylene oxide) glycol content was 30% by weight. After postcondensation in the solid phase the relative viscosity of the copolyester was 3.25. The copolyester was processed into a biaxially drawn flat film. The film was drawn biaxially at a draw ratio of 3.5×3.4. The drawing temperature was 80° C. The resulting film was transparent and had a thickness of 45 μm. In its dry state the film had the following properties:

| relative viscosity | 2,90 |
| strength (longitudinal) | 180 N/mm² |
| strength (transverse) | 164 N/mm² |
| modulus (longitudinal) | 170 N/mm² |
| modulus (transverse) | 217 N/mm² |
| elongation (longitudinal) | 140% |
| elongation (transverse) | 215% |

The strength of the film in the wet state was 10% lower than that in the dry state.

From a thermomechanical analysis it was found that upon the film being heated shrinkage sets in at 60° C. At 90° C. shrinkage was 10%. After treatment of the film for 3 hours in water of 80° C. shrinkage was 17%. The water vapour permeability of the film at 30° C. and 50% relative humidity was 800 g/m² 24 hours. (For a commercially available sausage casing of cellophane the water vapour permeability was 2000 g/m² 24 hours under the same conditions).

The above-mentioned biaxially drawn film was welded into a tube having a length of 50 cm and a flat width of 11 cm. The resulting tubular film was processed in the way indicated in Example III and made to form a casing of cooking sausage subjected to the smoking and cooking programme. For comparison, also a commercially available cellophane tube having a film thickness of 80 μm was included in the experiment.

Processing was without any problems. The tubular films according to the invention was found to form a tight sausage casing without any wrinkles. The brown coloration was found to be satisfactory.

Its flavour was similar to that of sausage cooked in cellophane. In the production process of the smoked sausage (stuffing, smoking, pasteurizing and cooling) there was no or very little difference between the behaviour of the biaxially drawn copolyester film according to the invention and that of the commercially available sausage casing.

I claim:

1. Packaging film, particularly for foodstuffs, which is permeable to smoke constituents, wherein the film entirely or substantially consists of a thermoplastic copolyester which is built up of recurrent long-chain and short-chain ester units which are joined head-to-tail through ester bonds, the long-chain ester units corresponding to the formula

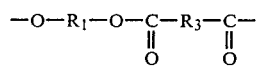

and the short-chain ester units to the formula:

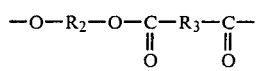

where $R_1$ is a divalent radical remaining after removal of the terminal hydroxyl groups from a poly(alkylene oxide) glycol having a molecular weight in the range of 600 to 6000 and a carbon to oxygen ratio of 2.0 to 2.7; $R_2$ is a divalent radical remaining after removal of the hydroxyl groups from a diol having a molecular weight not higher than 250; $R_3$ is a divalent radical remaining after removal of the carboxylic acid groups from a dicarboxylic acid; with the proviso that said long-chain ester units amount to 20 to 60% by weight of the copolyester and at least 70% of the $R_3$ groups are 1,4-phenylene radicals, and the phenol number of the film, expressed in mg per $m^2$, is at least 20, the thickness of said film being in the range of 1 to 300 microns.

2. Film according to claim 1, wherein $R_2$ is derived from an aliphatic diol having 2-4 carbon atoms.

3. Film according to claim 2, wherein $R_2$ is derived from 1,4-butanediol.

4. Film according to claim 1 wherein $R_1$ is derived from poly(ethylene oxide) glycol.

5. Film according to claim 1, wherein 100% of the $R_3$ groups are 1,4-phenylene radicals.

6. Film according to claim 1, wherein the molecular weight of the poly(alkylene oxide) glycol is in the range of 800 to 4000.

7. Film according to claim 1, wherein the phenol number is at least 50.

8. Film according to claim 1, wherein the aldehyde number of the film is at least 3000.

9. Film according to claim 1, wherein the acid number of the film is at least 200.

10. Film according to claim 1, wherein the film is flat.

11. Film according to claim 1, wherein the film is tubular.

12. Film according to claim 1, wherein the film is biaxially drawn.

13. Film according to claim 1, wherein $R_1$ is derived from poly(ethylene oxide) glycol, $R_2$ is derived from 1,4-butanediol and $R_3$ is 1,4-phenylene, the content of long-chain ester units in the copolyester is 30-45% by weight, the phenol number of the film is 50-500, the aldehyde number of the film is 3000-50,000, and the thickness of the film is 5-100 $\mu$m, and the film is biaxially drawn.

* * * * *